US012756016B2

(12) United States Patent
Yun et al.

(10) Patent No.: US 12,756,016 B2
(45) Date of Patent: Oct. 6, 2026

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Su Hyun Yun, Daejeon (KR); Bum Young Jung, Daejeon (KR); Sook Yun, Daejeon (KR); Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1051 days.

(21) Appl. No.: 17/789,574

(22) PCT Filed: Sep. 29, 2021

(86) PCT No.: PCT/KR2021/013287
§ 371 (c)(1),
(2) Date: Jun. 28, 2022

(87) PCT Pub. No.: WO2022/071734
PCT Pub. Date: Apr. 7, 2022

(65) Prior Publication Data
US 2023/0102148 A1 Mar. 30, 2023

(30) Foreign Application Priority Data
Sep. 29, 2020 (KR) ........................ 10-2020-0127441

(51) Int. Cl.
*H01M 10/0569* (2010.01)
*H01M 10/0525* (2010.01)
*H01M 10/0567* (2010.01)
*H01M 10/0568* (2010.01)

(52) U.S. Cl.
CPC ... *H01M 10/0569* (2013.01); *H01M 10/0525* (2013.01); *H01M 10/0567* (2013.01); *H01M 10/0568* (2013.01); *H01M 2300/0034* (2013.01); *H01M 2300/0037* (2013.01)

(58) Field of Classification Search
CPC ......... H01M 10/0569; H01M 10/0525; H01M 10/0567; H01M 10/0568; H01M 2300/0034; H01M 2300/003
See application file for complete search history.

(56) References Cited

U.S. PATENT DOCUMENTS

2010/0124708 A1 5/2010 Matsui et al.
2014/0199602 A1 7/2014 Kim et al.
2016/0099486 A1 4/2016 Noguchi et al.
2016/0172681 A1 6/2016 Yang et al.
2019/0198933 A1* 6/2019 Newhouse .............. H01M 4/13
2020/0099103 A1* 3/2020 Wang ................ H01M 10/0567
2020/0136187 A1* 4/2020 Juzkow ................. H01M 4/505
2021/0135285 A1 5/2021 Kim et al.
2021/0273264 A1 9/2021 Wang
2021/0273265 A1 9/2021 Wang
2021/0280911 A1 9/2021 Wang
2021/0280912 A1 9/2021 Wang
2021/0408604 A1 12/2021 Wen et al.

FOREIGN PATENT DOCUMENTS

CN 107417569 A 12/2017
CN 109301322 A 2/2019
CN 110994023 A * 4/2020 ........ H01M 10/0567
CN 111326799 A 6/2020
DE 102018000713 A1 7/2018
JP 2008027673 A 2/2008
KR 20070033839 A 3/2007
KR 20100055338 A 5/2010
KR 20190021160 A 3/2019
KR 20190115704 A 10/2019
WO 2014181877 A1 11/2014
WO 2020233234 A1 11/2020

OTHER PUBLICATIONS

English Machine Translation for CN-110994023-A (Year: 2020).*
International Search Report for Application No. PCT/KR2021/013287 mailed Jan. 11, 2022, 2 pages.
Nagasubramanian, G. et al., "Hydrofluoroether electrolytes for lithium-ion batteries: Reduced gas decomposition and nonflammable," Journal of Power Sources, Jun. 2011, pp. 8604-8609, vol. 196, Elsevier.
Search Report dated May 8, 2025 from the Office Action for Chinese Application No. 202180007429.1 issued May 19, 2025, pp. 1-2.

* cited by examiner

*Primary Examiner* — Matthew T Martin
*Assistant Examiner* — Katherine N Higgins
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte includes a lithium salt, a non-aqueous solvent, a compound represented by Formula 1, and a compound represented by Formula 2, wherein the compound represented by Formula 1 and the compound represented by Formula 2 are included in a volume ratio of 1:0.1 to 1:1.5. Also, a lithium secondary battery including the non-aqueous electrolyte has improved high-temperature storage safety.

11 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2021/013287, filed on Sep. 29, 2021, which claims priority from Korean Patent Application No. 10-2020-0127441, filed on Sep. 29, 2020, the disclosures of which are incorporated by reference herein.

TECHNICAL FIELD

The present invention relates to a non-aqueous electrolyte solution for a lithium secondary battery which includes an additive capable of improving flame retardancy, and a lithium secondary battery in which high-temperature storage safety is improved by including the same.

BACKGROUND ART

There is a need to develop technology for efficiently storing and utilizing electrical energy as personal IT devices and computer networks are developed with the recent development of information society and the accompanying dependency of society as a whole on the electrical energy is increased.

Particularly, studies of electricity storage devices, such as electric double-layer capacitors and lithium secondary batteries represented by lithium ion batteries, have been extensively conducted as an interest in solving environmental problems and realizing a sustainable circular society emerges.

Among them, since the lithium secondary batteries may be miniaturized to be applicable to a personal IT device, have high energy density and operating voltage, and has recently emerged as clean energy with low carbon dioxide emissions, the lithium secondary batteries have been actively researched as power sources for power storage and power sources for electric vehicles as well as power sources of notebook computers and mobile phones.

The lithium secondary battery uses a material including a lithium-containing transition metal oxide as a main component as a positive electrode, and uses a lithium alloy or a carbonaceous material typified by graphite as a negative electrode, a separator is disposed between the positive electrode and the negative electrode, and a non-aqueous electrolyte solution is used as a medium through which lithium (Li) ions move. One, in which an electrolyte, such as lithium hexafluorophosphate ($LiPF_6$), is dissolved in an organic solvent having a high dielectric constant, such as ethylene carbonate or dimethyl carbonate, is widely used as the non-aqueous electrolyte solution.

Most organic solvents used in the non-aqueous electrolyte solution are volatile and flammable substances, wherein, since they may cause fire and explosion when an emergency situation occurs in the battery, they become a cause of deteriorating safety of the battery during high-temperature storage.

Thus, there is a need for a non-aqueous electrolyte solution composition which has no risk of ignition and may improve overall battery performance, such as high-rate charge and discharge characteristics, as well as safety when used in a large-sized battery such as a power source for power storage or a power source for an electric vehicle.

DISCLOSURE OF THE INVENTION

Technical Problem

An aspect of the present invention provides a non-aqueous electrolyte solution for a lithium secondary battery which has improved safety.

Another aspect of the present invention provides a lithium secondary battery in which high-temperature storage safety is improved by including the non-aqueous electrolyte solution for a lithium secondary battery.

Technical Solution

According to an aspect of the present invention, there is provided a non-aqueous electrolyte solution for a lithium secondary battery which includes:

a lithium salt;

a non-aqueous solvent;

a compound represented by Formula 1, and a compound represented by Formula 2, wherein the compound represented by Formula 1 and the compound represented by Formula 2 are included in a volume ratio of 1:0.1 to 1:1.5:

[Formula 1]

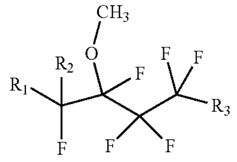

In Formula 1, $R_1$ to $R_3$ are each independently an alkyl group having 1 to 6 carbon atoms which is substituted with at least one fluorine.

[Formula 2]

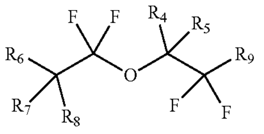

In Formula 2, $R_4$ and $R_5$ are each independently hydrogen or an alkyl group having 1 to 5 carbon atoms, $R_6$ to $R_8$ are each independently hydrogen, fluorine, or an alkyl group having 1 to 7 carbon atoms which is substituted with at least one fluorine, and $R_9$ is an alkyl group having 1 to 7 carbon atoms which is substituted with at least one fluorine.

According to another aspect of the present invention, there is provided a lithium secondary battery including the non-aqueous electrolyte solution for a lithium secondary battery.

Advantageous Effects

A non-aqueous electrolyte solution of the present invention may increase a flash point of the electrolyte solution by including two types of compounds containing a terminal group, in which at least one fluorine is substituted, as an additive. As a result, ignition of the non-aqueous electrolyte solution at a high temperature may be prevented or suppressed. Thus, when the non-aqueous electrolyte solution is included, a lithium secondary battery having improved safety and battery characteristics during high-temperature storage may be achieved.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Organic solvents used as a main component of a non-aqueous electrolyte solution during preparation of a lithium ion secondary battery are volatile and flammable substances, wherein, since they may cause fire and explosion when an emergency situation occurs in the battery, they may deteriorate safety of the battery during high-temperature storage.

Thus, the present invention aims at providing a non-aqueous electrolyte solution for a secondary battery which includes two types of additives capable of imparting flame retardancy in order to prevent or suppress fire of the electrolyte solution during high-temperature storage. Also, the present invention aims at providing a lithium secondary battery in which safety and battery characteristics during high-temperature storage are improved by including the non-aqueous electrolyte solution.

Non-Aqueous Electrolyte Solution for Lithium Secondary Battery

First, a non-aqueous electrolyte solution for a lithium secondary battery according to the present invention will be described.

The non-aqueous electrolyte solution for a lithium secondary battery of the present invention includes:

a lithium salt;

a non-aqueous solvent;

a compound represented by Formula 1, and a compound represented by Formula 2, wherein the compound represented by Formula 1 and the compound represented by Formula 2 are included in a volume ratio of 1:0.1 to 1:1.5:

[Formula 1]

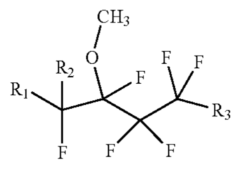

In Formula 1, $R_1$ to $R_3$ are each independently an alkyl group having 1 to 6 carbon atoms which is substituted with at least one fluorine.

[Formula 2]

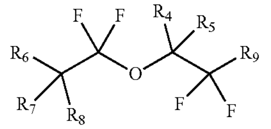

In Formula 2, $R_4$ and $R_5$ are each independently hydrogen or an alkyl group having 1 to 5 carbon atoms, $R_6$ to $R_8$ are each independently hydrogen, fluorine, or an alkyl group having 1 to 7 carbon atoms which is substituted with at least one fluorine, and $R_9$ is an alkyl group having 1 to 7 carbon atoms which is substituted with at least one fluorine.

(1) Lithium Salt

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF6^-$, $SbF6^-$, $CH_3SO_3$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, lithium bis(fluorosulfonyl)imide (LiFSI: $LiN(SO_2F)_2$), lithium bis(pentafluoroethanesulfonyl)imide (LiBETI: $LiN(SO_2CF_2CF_3)_2$), and lithium bis(trifluoromethanesulfonyl)imide (LiTFSI: $LiN(SO_2CF_3)_2$), or a mixture of two or more thereof. In addition to them, any lithium salt commonly used in an electrolyte solution of a lithium secondary battery may be used without limitation.

The lithium salt may be appropriately changed in a normally usable range, but may be included in a concentration of 0.8 M to 3.0 M, for example, 1.0 M to 3.0 M in the electrolyte solution to obtain an optimum effect of forming a film for preventing corrosion of a surface of an electrode.

In a case in which the concentration of the lithium salt satisfies the above range, viscosity of the non-aqueous electrolyte solution may be controlled so that optimal impregnability may be achieved, and an effect of improving capacity characteristics and cycle characteristics of the lithium secondary battery may be obtained by improving mobility of lithium ions.

(2) Non-Aqueous Solvent

The non-aqueous solvent of the present invention may include a cyclic carbonate-based organic solvent, a linear carbonate-based organic solvent, or a mixed organic solvent thereof.

The cyclic carbonate-based organic solvent is an organic solvent which may well dissociate a lithium salt in an electrolyte solution due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In order to secure high ionic conductivity of the non-aqueous electrolyte solution in the present invention, the cyclic carbonate-based organic solvent and the linear carbonate-based organic solvent may be used by being mixed in a volume ratio of 10:90 to 50:50, for example, 15:85 to 30:70.

Furthermore, the non-aqueous solvent may further include at least one organic solvent of a linear ester-based organic solvent and a cyclic ester-based organic solvent, which have lower melting point and higher stability at high temperature than the cyclic carbonate-based organic solvent and/or the linear carbonate-based organic solvent, to prepare an electrolyte solution having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The non-aqueous solvent may be used by adding an organic solvent typically used in an electrolyte solution for a lithium secondary battery without limitation, if necessary. For example, the non-aqueous solvent may further include at least one organic solvent selected from an ether-based organic solvent, an amide-based organic solvent, and a nitrile-based organic solvent.

(3) Compound Represented by Formula 1: First Additive

In the present invention, in order to prevent ignition and explosion of the non-aqueous electrolyte solution during high-temperature storage and to prevent deterioration of safety of the battery, a compound represented by the following Formula 1 may be included as a first additive capable of imparting flame retardancy in the non-aqueous electrolyte solution.

[Formula 1]

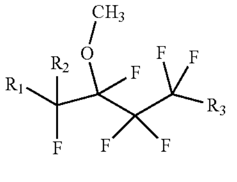

In Formula 1, $R_1$ to $R_3$ are each independently an alkyl group having 1 to 6 carbon atoms which is substituted with at least one fluorine.

Since the compound represented by Formula 1 includes a terminal group, in which at least one fluorine is substituted, in a molecular structure, it has a high flash point, and thus, it may improve flame retardancy of the electrolyte solution and may form a robust solid electrolyte interphase (SEI) including a fluorine component on a surface of an electrode. Also, since the compound represented by Formula 1 includes an ether group in the molecular structure, it helps to improve lithium solubility, and thus, it may reduce the viscosity of the electrolyte solution and simultaneously, may improve ionic conductivity through interaction with lithium ions.

Therefore, since the non-aqueous electrolyte solution of the present invention includes the compound represented by Formula 1 as the first additive, viscosity and volatility are reduced and a flash point temperature is increased, and thus, ignition may be suppressed during high-temperature storage. Therefore, a lithium secondary battery having improved safety and battery characteristics during high-temperature storage may be achieved.

Specifically, in Formula 1, $R_1$ to $R_3$ may each independently be an alkyl group having 1 to 4 carbon atoms which is substituted with at least one fluorine, and specifically, $R_1$ to $R_3$ may each independently an alkyl group having 1 to 3 carbon atoms which is substituted with at least one fluorine.

More specifically, the compound represented by Formula 1 may be a compound represented by the following [Formula 1-1].

[Formula 1-1]

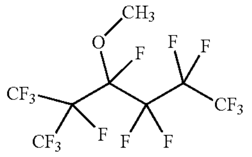

(4) Compound Represented by Formula 2: Second Additive

The non-aqueous electrolyte solution for a lithium secondary battery of the present invention may include a compound represented by the following Formula 2 as a second additive together in order to further improve a flame-retardant effect.

[Formula 2]

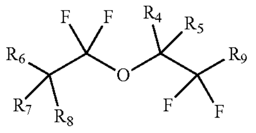

In Formula 2, $R_4$ and $R_5$ are each independently hydrogen or an alkyl group having 1 to 5 carbon atoms, $R_6$ to $R_8$ are each independently hydrogen, fluorine, or an alkyl group having 1 to 7 carbon atoms which is substituted with at least one fluorine, and $R_9$ is an alkyl group having 1 to 7 carbon atoms which is substituted with at least one fluorine.

Since the compound represented by Formula 2 includes a terminal group, in which at least one fluorine is substituted, in a molecular structure, it has a high flash point, and thus, it may further improve the flame retardancy of the electrolyte solution and simultaneously, may form a robust SEI including a fluorine component on the surface of the electrode.

Therefore, since the non-aqueous electrolyte solution of the present invention includes the compound represented by Formula 2, the flash point temperature may be increased to suppress ignition during high-temperature storage, and thus, a lithium secondary battery having improved safety and battery characteristics during high-temperature storage may be achieved.

Specifically, in Formula 2, $R_4$ and $R_5$ are each independently hydrogen or an alkyl group having 1 to 3 carbon atoms, $R_6$ is fluorine or an alkyl group having 1 to 7 carbon atoms which is substituted with at least one fluorine, $R_7$ and $R_8$ are each independently hydrogen or fluorine, and $R_9$ is an alkyl group having 1 to 5 carbon atoms which is substituted with at least one fluorine.

Preferably, the compound represented by Formula 2 may include at least one of compounds represented by [Formula 2-1] and [Formula 2-2] below.

[Formula 2-1]

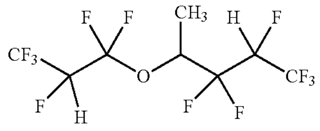

2-trifluoro-2-fluoro-3-difluoropropoxy-3-difluoro-4-fluoro-5-trifluoropentane; TPTP

[Formula 2-2]

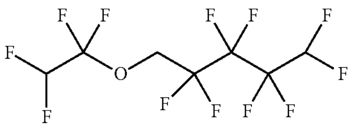

1H,1H,5H-octafluoropentyl-1,1,2,2-tetrafluoroethyl ether (OTE)

Also, the compound represented by Formula 1 and the compound represented by Formula 2 in the non-aqueous electrolyte solution of the present invention may be included in a volume ratio of 1:0.1 to 1:1.5.

If the compound represented by Formula 2 is included within the above range, since ignition may be prevented by improving flame retardant characteristics of the battery and performance degradation may be minimized, high-temperature storage safety may be further improved. That is, if the second additive is included in a volume ratio of less than 0.1, a flame retardancy improvement effect may be insignificant. Also, if the second additive is included in a volume ratio of greater than 1.5, battery performance may be degraded while a degree of dissociation for the lithium salt is lower than that of a general electrolyte solution.

Specifically, the compound represented by Formula 1 and the compound represented by Formula 2 may be included in a volume ratio of 1:0.2 to 1:1.

The non-aqueous organic solvent and the additive, that is, the compound represented by Formula 1 and the compound represented by Formula 2, in the non-aqueous electrolyte solution of the present invention may be included in a volume ratio of 10:90 to 80:20, for example, 30:70 to 70:30.

If the additive including the compound represented by Formula 1 and the compound represented by Formula 2 of the present invention is included within the above range, high-temperature storage characteristics and battery characteristics may be further improved by improving the flame retardancy of the electrolyte solution.

If a total amount of the additive including the compound represented by Formula 1 and the compound represented by Formula 2 is greater than a volume ratio of 90, the flame-retardant effect is significantly improved, but a side reaction may be increased to degrade the battery performance such as rate capability and cycle characteristics. Also, if the total amount of the additive including the compound represented by Formula 1 and the compound represented by Formula 2 is less than a volume ratio of 20, since it is difficult to continuously maintain the flame-retardant effect, an effect of improving the flame retardancy and battery characteristics may be reduced over time.

(5) Third Additive

The non-aqueous electrolyte solution for a lithium secondary battery of the present invention may further include a third additive known as a flame retardant to improve the flame retardancy.

The third additive may include at least one compound selected from succinonitrile (SN), trimethyl phosphate (TMP), and di-(2,2,2-trifluoroethyl) carbonate (DFDEC).

In this case, the compound represented by Formula 1 and the third additive may be included in a volume ratio of 1:0.1 to 1:5, for example, 1:0.2 to 1:1.5.

If the third additive is included within the above range, the flame retardancy of the electrolyte solution may be further improved. If, in a case in which an amount of the third additive is less than a volume ratio of 0.1, the flame-retardant effect may be insignificant, and, if the amount of the third additive is greater than a volume ratio of 5, since resistance may increase as a film thickness is increased due to a side reaction caused by the excessive amount of the additive, the battery performance may be degraded.

(6) Other Additives

The non-aqueous electrolyte solution for a lithium secondary battery of the present invention may further include other additives, which may form a robust film on the surface of the electrode or may improve moisture-retention ability by increasing dispersibility of the electrolyte solution, in order to further improve an effect such as cycle characteristics and rate capability.

The other additive may include at least one compound selected from FEC, a nonionic surfactant, cetrimonium chloride (CTAC), cationic cetyl trimethyl ammonium bromide (CTAB), and anionic sodium dodecyl benzene sulfonate (SDBS).

The nonionic surfactant may include a compound represented by the following Formula 3.

[Formula 3]

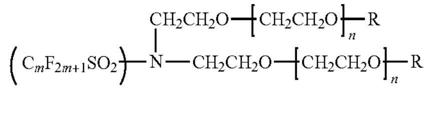

In Formula 3,

R is hydrogen, an acetyl group, a methyl group, or a benzoyl group, at least one of the two R is not hydrogen; and m and n are each independently an integer of 2 to 20.

The other additives may be included in an amount of less than 4 wt %, for example, 0.1 wt % to 3 wt % based on a total weight of the non-aqueous electrolyte solution.

In a case in which the amount of the other additives is less than 0.1 wt %, effects of improving low-temperature capacity of the battery and improving high-temperature storage characteristics and high-temperature life characteristics are insignificant, and, in a case in which the amount of the other additives is greater than 4 wt %, there is a possibility that a side reaction in the electrolyte may occur excessively during charge and discharge of the battery. Particularly, if the excessive amount of the additives for forming an SEI is added, the additives for forming an SEI may not be sufficiently decomposed at high temperature so that they may be present in the form of an unreacted material or precipitates in the electrolyte solution at room temperature. Accordingly, a side reaction that degrades life or resistance characteristics of the battery may occur.

Lithium Secondary Battery

Next, the present invention provides a lithium secondary battery including the above-described non-aqueous electrolyte solution for a lithium secondary battery.

The lithium secondary battery according to the present invention may include a positive electrode, a negative electrode, a separator disposed between the positive electrode and the negative electrode, and the non-aqueous electrolyte solution of the present invention.

Since the non-aqueous electrolyte solution of the present invention has been described above, a description thereof will be omitted and other components will be described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode active material is a compound capable of reversibly intercalating and deintercalating lithium, wherein the positive electrode active material may include a lithium transition metal oxide including lithium and at least one metal selected from cobalt, manganese, nickel, or aluminum, and may specifically include at least one of a lithium-manganese-based oxide with high capacity characteristics and safety of the battery (e.g., $LiMnO_2$, $LiMn_2O_4$, etc.) and a lithium-nickel-manganese-cobalt-based oxide represented by the following Formula 4. Specifically, the positive electrode active material may include a lithium-nickel-manganese-cobalt-based oxide.

[Formula 4]

$$Li(Ni_xCO_yMn_z)O_2$$

(in Formula 4, $0<x<1$, $0<y<1$, $0<z<1$, and $x+y+z=1$)

As a representative example, the positive electrode active material may include $Li(Ni_{1/3}Mn_{1/3}Co_{1/3})O_2$, $Li(Ni_{0.5}Mn_{0.3}Co_{0.2})O_2$, $Li(Ni_{0.6}Mn_{0.2}Co_{0.2})O_2$, $Li(Ni_{0.7}Mn_{0.15}Co_{0.15})O_2$, and $Li(Ni_{0.8}Mn_{0.1}Co_{0.1})O_2$.

Particularly, it is desirable for the positive electrode active material of the present invention to include $Li(Ni_{0.6}Mn_{0.2}Co_{0.2})O_2$, $Li(Ni_{0.7}Mn_{0.15}Co_{0.15})O_2$, and $Li(Ni_{0.8}Mn_{0.1}Co_{0.1})O_2$ in which an amount of nickel among transition metals is 60 atm % or more. That is, since higher capacity may be achieved as the amount of the nickel among the transition metals is increased, the use of one having a nickel content of 60 atm % or more is more advantageous to achieved high capacity. In a case in which a transition metal oxide with high nickel (Hi-Ni) content, in which the Ni content is greater than 0.55, is included as the positive electrode active material, output characteristics of the lithium secondary battery may be improved by securing high energy density.

With respect to a high-Ni (Hi-Ni) oxide having a Ni content greater than 0.55, since sizes of a $Li^{+1}$ ion and a $Ni^{+2}$ ion are similar to each other, a cation mixing phenomenon occurs in which positions of the $Li^{+1}$ ion and the $Ni^{+2}$ ion are changed each other in a layered structure of the positive electrode active material during charge and discharge process. That is, a nickel transition metal having a d orbital must have an octahedron structure during coordinate bonding in an environment, such as a high temperature, according to a change in oxidation number of Ni contained in the positive electrode active material, but a crystal structure of the positive electrode active material may be deformed and collapsed while a twisted octahedron is formed by a non-uniform reaction in which the order of the energy level is reversed or the oxidation number is changed by external energy supply. Furthermore, since another side reaction occurs in which a transition metal, particularly, a nickel metal is dissolved from the positive electrode active material due to a side reaction between the positive electrode active material and the electrolyte solution during high-temperature storage, overall performance of the secondary battery is degraded due to the structural collapse of the positive electrode active material along with the depletion of the electrolyte solution.

Thus, with respect to the lithium secondary battery of the present invention, since the positive electrode including the high-Ni (Hi-Ni) transition metal oxide as the positive electrode active material as well as the non-aqueous electrolyte solution including the additive with a specific configuration is used, a robust ion conductive film is formed on a surface of the positive electrode to suppress the cation mixing phenomenon of the $Li^{+1}$ ion and the $Ni^{+2}$ ion and to effectively suppress the side reaction between the positive electrode and the electrolyte solution and the metal dissolution phenomenon, and thus, the structural instability of the high-capacity electrode may be alleviated. Therefore, since the sufficient amount of the nickel transition metal for ensuring the capacity of the lithium secondary battery may be secured, the energy density may be increased to prevent a decrease in output characteristics.

The positive electrode active material may be included in an amount of 80 wt % to 99 wt %, for example, 90 wt % to 99 wt % based on a total weight of solid content in the positive electrode slurry. In this case, when the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: manganese (Mn), iron (Fe), Pb, or Ge; Me': Al, boron (B), phosphorus (P), Si, Groups I, II and III elements of the periodic table, or halogen; $0<x\le 1$; $1\le y\le 3$; $1\le z\le 8$) may be used as the metal composite oxide.

The material, which may be doped and undoped with lithium, may include Si, $SiO_x$ ($0<x<2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder and the conductive agent may be the same as or different from those of the positive electrode.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Non-Aqueous Electrolyte Solution for Lithium Secondary Battery

Example 1

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-2 were mixed in a volume ratio of 1:0.25 and used as the additive.

Example 2

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-1 were mixed in a volume ratio of 1:0.25 and used as the additive.

Example 3

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 40:60 and dissolving $LiPF_6$ such that a concentration of the $LiPF_6$ was 1.2 M. In this case, the compound represented by Formula 1-1, the compound represented by Formula 2-2, and succinonitrile (SN) were mixed in a volume ratio of 1:0.25:0.25 and used as the additive.

Example 4

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-2 were mixed in a volume ratio of 1:0.52 and used as the additive.

Example 5

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-1 were mixed in a volume ratio of 1:0.52 and used as the additive.

Example 6

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-2 were mixed in a volume ratio of 1:1 and used as the additive.

Example 7

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-1 were mixed in a volume ratio of 1:1 and used as the additive.

Example 8

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-2 were mixed in a volume ratio of 1:1.5 and used as the additive.

Comparative Example 1

A non-aqueous electrolyte solution was prepared by dissolving $LiPF_6$ in a non-aqueous solvent, in which ethylene carbonate (EC) and diethyl carbonate (DEC) were mixed in a volume ratio of 5:95, such that a concentration of the $LiPF_6$ was 1.2 M.

Comparative Example 2

A non-aqueous electrolyte solution was prepared by mixing ethylene carbonate (EC) and succinonitrile (SN) in a volume ratio of 5:95 and dissolving $LiPF_6$ such that a concentration of the $LiPF_6$ was 1.2 M.

Comparative Example 3

A non-aqueous electrolyte solution was prepared by adding an additive (fluoroethylene carbonate (FEC)) to a non-aqueous solvent, in which ethylene carbonate (EC) and diethyl carbonate (DEC) were mixed in a volume ratio of 30:60, in a volume ratio of 90:10 and dissolving $LiPF_6$ such that a concentration of the $LiPF_6$ was 1.2 M.

Comparative Example 4

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 was used alone as the additive.

Comparative Example 5

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-2 were mixed in a volume ratio of 1:0.09 and used as the additive.

Comparative Example 6

A non-aqueous electrolyte solution was prepared by adding an additive to a non-aqueous solvent, in which ethylene carbonate (EC) and diethyl carbonate (DEC) were mixed in a volume ratio of 10:90, in a volume ratio of 50:50 and dissolving $LiPF_6$ such that a concentration of the $LiPF_6$ was 1.2 M. In this case, the compound represented by Formula 1-1 and the compound represented by Formula 2-2 were mixed in a volume ratio of 1:1.7 and used as the additive.

TABLE 1

| | First additive | Second additive | Third additive | Other additives | Volume ratio of non-aqueous solvent to total additives | Volume ratio of first additive to second additive | Volume ratio of first additive to third additive |
|---|---|---|---|---|---|---|---|
| Example 1 | Formula 1-1 | Formula 2-2 | — | — | 50:50 | 1:0.25 | — |
| Example 2 | Formula 1-1 | Formula 2-1 | — | — | 50:50 | 1:0.25 | — |
| Example 3 | Formula 1-1 | Formula 2-2 | SN | — | 40:60 | 1:0.25 | 1:0.25 |
| Example 4 | Formula 1-1 | Formula 2-2 | — | — | 50:50 | 1:0.52 | — |
| Example 5 | Formula 1-1 | Formula 2-1 | — | — | 50:50 | 1:0.52 | — |
| Example 6 | Formula 1-1 | Formula 2-2 | — | — | 50:50 | 1:1 | — |
| Example 7 | Formula 1-1 | Formula 2-1 | — | — | 50:50 | 1:1 | — |
| Example 8 | Formula 1-1 | Formula 2-2 | — | — | 50:50 | 1:1.5 | — |
| Comparative Example 1 | — | — | — | — | — | — | — |
| Comparative Example 2 | — | — | SN | — | 5:95 | — | — |
| Comparative Example 3 | — | — | — | FEC | 90 :10 | — | — |
| Comparative Example 4 | Formula 1-1 | — | — | — | 50:50 | 1:0 | — |
| Comparative Example 5 | Formula 1-1 | Formula 2-2 | — | — | 50:50 | 1:0.09 | — |
| Comparative Example 6 | Formula 1-1 | Formula 2-2 | — | — | 50:50 | 1:1.7 | — |

In Table 1, the abbreviation of each compound has the following meaning.

SN: succinonitrile

FEC: fluoroethylene carbonate

II. Lithium Secondary Battery Preparation

Example 9

A positive electrode active material ($Li(Ni_{0.8}Mn_{0.1}Co_{0.1})O_2$), a conductive agent (carbon black), and a binder (polyvinylidene fluoride) were added to N-methyl-2-pyrrolidone (NMP) in a weight ratio of 97.5:1:1.5 to prepare a positive electrode slurry (solid content: 50 wt %). A 12 μm thick aluminum (Al) thin film, as a positive electrode collector, was coated with the positive electrode slurry, dried, and then roll-pressed to prepare a positive electrode.

A negative electrode active material (graphite), a binder (SBR-CMC), and a conductive agent (carbon black) were added to water, as a solvent, in a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly was accommodated in a pouch-type battery case, and the non-aqueous electrolyte solution for a lithium secondary battery of Example 1 was injected thereinto to prepare a lithium secondary battery.

Example 10

A pouch-type lithium secondary battery was prepared in the same manner as in Example 9 except that the lithium secondary battery was prepared by injecting the non-aqueous electrolyte solution of Example 2 instead of the non-aqueous electrolyte solution of Example 1.

Example 11

A pouch-type lithium secondary battery was prepared in the same manner as in Example 9 except that the lithium secondary battery was prepared by injecting the non-aqueous electrolyte solution of Example 3 instead of the non-aqueous electrolyte solution of Example 1.

Example 12

A pouch-type lithium secondary battery was prepared in the same manner as in Example 9 except that the lithium secondary battery was prepared by injecting the non-aqueous electrolyte solution of Example 4 instead of the non-aqueous electrolyte solution of Example 1.

Example 13

A pouch-type lithium secondary battery was prepared in the same manner as in Example 9 except that the lithium secondary battery was prepared by injecting the non-aqueous electrolyte solution of Example 5 instead of the non-aqueous electrolyte solution of Example 1.

Example 14

A pouch-type lithium secondary battery was prepared in the same manner as in Example 9 except that the lithium secondary battery was prepared by injecting the non-aqueous electrolyte solution of Example 6 instead of the non-aqueous electrolyte solution of Example 1.

Example 15

A pouch-type lithium secondary battery was prepared in the same manner as in Example 9 except that the lithium secondary battery was prepared by injecting the non-aqueous electrolyte solution of Example 7 instead of the non-aqueous electrolyte solution of Example 1.

Example 16

A pouch-type lithium secondary battery was prepared in the same manner as in Example 9 except that the lithium secondary battery was prepared by injecting the non-aqueous electrolyte solution of Example 8 instead of the non-aqueous electrolyte solution of Example 1.

Comparative Example 7

A pouch-type lithium secondary battery was prepared in the same manner as in Example 9 except that the lithium secondary battery was prepared by injecting the non-aqueous electrolyte solution of Comparative Example 1 instead of the non-aqueous electrolyte solution of Example 1.

Comparative Example 8

A pouch-type lithium secondary battery was prepared in the same manner as in Example 9 except that the lithium secondary battery was prepared by injecting the non-aqueous electrolyte solution of Comparative Example 2 instead of the non-aqueous electrolyte solution of Example 1.

Comparative Example 9

A pouch-type lithium secondary battery was prepared in the same manner as in Example 9 except that the lithium secondary battery was prepared by injecting the non-aqueous electrolyte solution of Comparative Example 3 instead of the non-aqueous electrolyte solution of Example 1.

Comparative Example 10

A pouch-type lithium secondary battery was prepared in the same manner as in Example 9 except that the lithium secondary battery was prepared by injecting the non-aqueous electrolyte solution of Comparative Example 4 instead of the non-aqueous electrolyte solution of Example 1.

Comparative Example 11

A pouch-type lithium secondary battery was prepared in the same manner as in Example 9 except that the lithium secondary battery was prepared by injecting the non-aqueous electrolyte solution of Comparative Example 5 instead of the non-aqueous electrolyte solution of Example 1.

Comparative Example 12

A pouch-type lithium secondary battery was prepared in the same manner as in Example 9 except that the lithium secondary battery was prepared by injecting the non-aqueous electrolyte solution of Comparative Example 6 instead of the non-aqueous electrolyte solution of Example 1.

EXPERIMENTAL EXAMPLES

Experimental Example 1. Flame Retardancy Evaluation 1 g of each of the non-aqueous electrolyte solutions of Examples 1 to 8 and 1 g of each of the non-aqueous electrolyte solutions of Comparative Examples 1 to 6 were put in metal containers, respectively, and a surface of the electrolyte solution was ignited with a gas lighter to check whether the electrolyte solution was ignited or not, and the results thereof are presented in Table 2 below.

In this case, a case where the electrolyte solution was ignited was indicated by O, and a case where the electrolyte solution was not ignited was indicated by x.

TABLE 2

| | Presence of ignition |
|---|---|
| Comparative Example 1 | ○ |
| Comparative Example 2 | X |
| Comparative Example 3 | X |
| Comparative Example 4 | X |
| Comparative Example 5 | X |
| Comparative Example 6 | X |
| Example 1 | X |
| Example 2 | X |
| Example 3 | X |
| Example 4 | X |
| Example 5 | X |
| Example 6 | X |
| Example 7 | X |
| Example 8 | X |

Referring to Table 2, it may be confirmed that, except for the electrolyte solution of Comparative Example 1 which did not include an additive, all of the non-aqueous electrolyte solutions of Comparative Examples 2 to 6 and the non-aqueous electrolyte solutions of Examples 1 to 8, which included the flame retardant additive, were not ignited.

Experimental Example 2. Cycle Characteristics Evaluation

After an activation (formation) process was performed at 0.2 C rate on the lithium secondary batteries prepared in Examples 9 to 16 and the lithium secondary batteries prepared in Comparative Examples 7 to 12, gas in each battery was removed through a degassing process.

3 cycles of an initial charge and discharge process, in which charging of each lithium secondary battery having gas removed therefrom at 0.2 C rate to 4.45 V under a constant current/constant voltage condition at room temperature (25° C.), cut-off charging at 0.05 C, and discharging at 0.2 C rate to 3.0 V were set as one cycle, were performed using charge/discharge equipment. In this case, PNE-0506 charge/discharge equipment (manufacturer: PNE SOLUTION) was used as the charge/discharge equipment used for the charging and discharging of the battery.

Subsequently, 74 cycles of a charge and discharge process, in which charging of each lithium secondary battery at 1.0 C rate to 4.45 V at a high temperature (45° C.), cut-off charging at 0.05 C under a constant current/constant voltage condition, and cut-off discharging at a constant current of 1.0 C rate to 3.0 V were set as one cycle, were performed using the charge/discharge equipment.

Subsequently, discharge capacity after 74 cycles was measured, cycle characteristics were obtained by comparing the discharge capacity after 74 cycles with initial capacity, and the results thereof are presented in Table 3 below.

Experimental Example 3. Rate Capability Evaluation

After a formation process was performed by charging the lithium secondary batteries prepared in Examples 9 to 16 and the lithium secondary batteries prepared in Comparative Examples 7 to 12 at 0.2 C rate to a state of charge (SOC) of 100%, a degassing process was performed after aging for 4 hours. Each lithium secondary battery after degassing was initially charged at 0.5 C rate to 4.2 V and a current of 0.05 C under a constant current-constant voltage (CC-CV) condition at 25° C., and discharged at 0.5 C rate to 3.0 V under a CC condition, and an initial discharge capacity value was checked.

Then, after each lithium secondary battery was charged at 0.5 C rate to 4.2 V and a current of 0.05 C under a constant current-constant voltage (CC-CV) condition at 25° C. and discharged at 2 C rate and 4 C rate to 3.0 V, respectively, discharge capacities at 2 C and 4 C relative to initial discharge capacity were evaluated and presented in Table 3 below.

TABLE 3

| | Cycle characteristics | Rate capability (%) | |
|---|---|---|---|
| | (%) | 2C | 4C |
| Example 9 | 94.1 | 98.0 | 98.0 |
| Example 10 | 95.3 | 98.5 | 98.5 |
| Example 11 | 93.1 | 98.2 | 97.2 |
| Example 12 | 94.3 | 98.4 | 98.1 |
| Example 13 | 94.0 | 98.4 | 97.5 |
| Example 14 | 94.6 | 98.5 | 98.5 |
| Example 15 | 94.3 | 98.3 | 98.1 |
| Example 16 | 93.0 | 97.5 | 90.0 |
| Comparative Example 7 | 90.5 | 96.0 | 80.0 |
| Comparative Example 8 | 87.3 | 90.0 | 78.0 |
| Comparative Example 9 | 87.3 | 90.0 | 75.0 |
| Comparative Example 10 | 92.5 | 97.2 | 85.0 |
| Comparative Example 11 | 92.7 | 97.4 | 88.0 |
| Comparative Example 12 | 88.1 | 90.1 | 76.5 |

Referring to Table 3, the secondary batteries of Examples 9 to 16 had a discharge capacity retention after 74 cycles of about 93% or more, wherein it may be understood that the discharge capacity retentions after 74 cycles were improved in comparison to those of the secondary batteries of Comparative Examples 7 to 12.

Also, referring to Table 3, the secondary batteries of Examples 9 to 16 had a rate capability at 2 C of 97.5% or more and a rate capability at 4 C of 90.0% or more, wherein it may be understood that the rate capabilities at 2 C and rate capabilities at 4 C were improved in comparison to those of the secondary batteries of Comparative Examples 7 to 12, respectively.

The invention claimed is:

1. A non-aqueous electrolyte solution for a lithium secondary battery, the non-aqueous electrolyte solution comprising:

a lithium salt present in a concentration of 0.8 M to 3.0 M;

a non-aqueous solvent;

a compound represented by Formula 1; and a compound represented by Formula 2, wherein the compound represented by Formula 1 and the compound represented by Formula 2 are present in a volume ratio of 1:0.1 to 1:1.5:

[Formula 1]

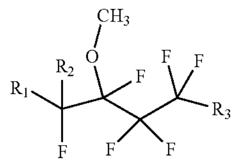

wherein, in Formula 1,

R1 to R3 are each independently an alkyl group having 1 to 6 carbon atoms which is substituted with at least one fluorine,

[Formula 2]

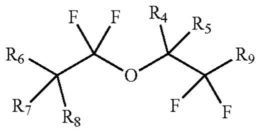

wherein, in Formula 2,

R4 and R5 are each independently hydrogen or an alkyl group having 1 to 5 carbon atoms, R6 to R8 are each independently hydrogen, fluorine, or an alkyl group having 1 to 7 carbon atoms which is substituted with at least one fluorine, and R9 is an alkyl group having 1 to 7 carbon atoms which is substituted with at least one fluorine.

2. The non-aqueous electrolyte solution for a lithium secondary battery of claim 1, wherein, in Formula 1, R1 to R3 are each independently an alkyl group having 1 to 4 carbon atoms which is substituted with at least one fluorine.

3. The non-aqueous electrolyte solution for a lithium secondary battery of claim 1, wherein, in Formula 1, R1 to R3 are each independently an alkyl group having 1 to 3 carbon atoms which is substituted with at least one fluorine.

4. The non-aqueous electrolyte solution for a lithium secondary battery of claim 1, wherein the compound represented by Formula 1 is a compound represented by Formula 1-1

[Formula 1-1]

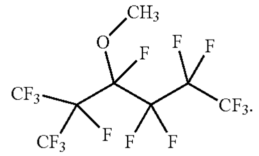

5. The non-aqueous electrolyte solution for a lithium secondary battery of claim 1, wherein, in Formula 2, R4 and R5 are each independently hydrogen or an alkyl group having 1 to 3 carbon atoms, R6 is fluorine or an alkyl group having 1 to 7 carbon atoms which is substituted with at least one fluorine, R7 and R8 are each independently hydrogen or fluorine, and $R_9$ is an alkyl group having 1 to 5 carbon atoms which is substituted with at least one fluorine.

6. The non-aqueous electrolyte solution for a lithium secondary battery of claim 1, wherein the compound represented by Formula 2 comprises at least one of compounds represented by Formula 2-1 and Formula 2-2:

[Formula 2-1]

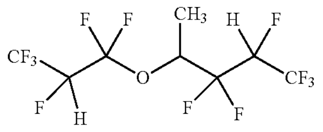

[Formula 2-2]

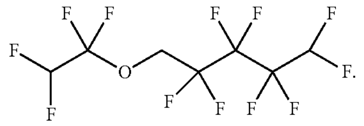

7. The non-aqueous electrolyte solution for a lithium secondary battery of claim 1, wherein the compound represented by Formula 1 and the compound represented by Formula 2 are present in a volume ratio of 1:0.2 to 1:1.

8. The non-aqueous electrolyte solution for a lithium secondary battery of claim 1, further comprising at least one additive selected from succinonitrile, trimethyl phosphate, and di-(2,2,2-trifluoroethyl) carbonate.

9. The non-aqueous electrolyte solution for a lithium secondary battery of claim 8, wherein the compound represented by Formula 1 and the additive are present in a volume ratio of 1:0.1 to 1:5.

10. A lithium secondary battery comprising:

a positive electrode;

a negative electrode facing the positive electrode;

a separator disposed between the positive electrode and the negative electrode; and the non-aqueous electrolyte solution of claim 1.

11. A lithium secondary battery of claim 10, wherein the negative electrode consists of a carbon-based negative electrode active material.

* * * * *